US011582600B2

United States Patent
Van Den Berg

(10) Patent No.: US 11,582,600 B2
(45) Date of Patent: Feb. 14, 2023

(54) SECURE RADIO FREQUENCY-BASED IMAGING

(71) Applicant: Nokia Technologies Oy, Espoo (FI)

(72) Inventor: Jan Jasper Van Den Berg, London (GB)

(73) Assignee: Nokia Technologies Oy, Espoo (FI)

(*) Notice: Subject to any disclaimer, the term of this patent is extended or adjusted under 35 U.S.C. 154(b) by 204 days.

(21) Appl. No.: 16/986,373

(22) Filed: Aug. 6, 2020

(65) Prior Publication Data
US 2021/0044970 A1 Feb. 11, 2021

(30) Foreign Application Priority Data
Aug. 9, 2019 (EP) .................................... 19190962

(51) Int. Cl.
| | |
|---|---|
| *G06F 7/04* | (2006.01) |
| *G06F 15/16* | (2006.01) |
| *H04L 29/06* | (2006.01) |
| *H04W 12/02* | (2009.01) |
| *H04B 1/38* | (2015.01) |
| *H04L 43/12* | (2022.01) |
| *H04W 12/08* | (2021.01) |

(52) U.S. Cl.
CPC .............. *H04W 12/02* (2013.01); *H04B 1/38* (2013.01); *H04L 43/12* (2013.01); *H04W 12/08* (2013.01)

(58) Field of Classification Search
CPC ........ H04W 12/02; H04W 12/08; H04B 1/38; H04L 43/12

USPC ............................................................ 726/4
See application file for complete search history.

(56) References Cited

U.S. PATENT DOCUMENTS

| | | | |
|---|---|---|---|
| 2014/0329540 A1 | 11/2014 | Duggan et al. | |
| 2017/0316248 A1* | 11/2017 | He .......................... | G06V 40/13 |
| 2018/0143311 A1 | 5/2018 | Melamed et al. | |
| 2018/0172820 A1 | 6/2018 | Rhead et al. | |
| 2018/0351412 A1* | 12/2018 | Gabriel ................ | H04B 5/0056 |
| 2019/0188533 A1* | 6/2019 | Katabi ..................... | G01S 13/88 |

OTHER PUBLICATIONS

Adib et al., "Capturing the Human Figure Through a Wall", ACM Transactions on Graphics, vol. 34, No. 6, Article 219, Nov. 2015, pp. 219:1-219:13.

Zhao et al., "Through-Wall Human Pose Estimation Using Radio Signals", IEEE/CVF Conference on Computer Vision and Pattern Recognition, 2018, pp. 7356-7365.

(Continued)

*Primary Examiner* — Fatoumata Traore
*Assistant Examiner* — Samuel Ambaye
(74) *Attorney, Agent, or Firm* — Fay Sharpe LLP

(57) ABSTRACT

According to an example aspect of the present invention, there is provided a method comprising, transmitting by a wireless device, during a first phase, a first probe signal associated with a user and receiving a reflected version of the first probe signal, transmitting by the wireless device, during the first phase, the reflected version of the first probe signal to a ground truth classifier, transmitting by the wireless device, during a second phase, a second probe signal associated with the user and receiving a reflected version of the second probe signal and transmitting by the wireless device, during the second phase, the reflected version of the second probe signal to a trusted apparatus.

20 Claims, 8 Drawing Sheets

(56) References Cited

OTHER PUBLICATIONS

"Building a Camera That Can See Wifi I Part 3 SUCCESS!", YouTube, Retrieved on Jul. 17, 2020, Webpage available at: https://www.youtube.com/watch?v=g3LT_b6K0Mc.
Adib et al., "Multi-Person Localization via RF Body Reflections", Proceedings of the 12th USENIX Symposium on Networked Systems Design and Implementation, 2015, pp. 279-292.
Wang et al., "A Hybrid FMCW-Interferometry Radar for Indoor Precise Positioning and Versatile Life Activity Monitoring", IEEE Transactions on Microwave Theory and Techniques, vol. 62, No. 11, Nov. 2014, pp. 2812-2822.
"Quuppa Intelligent Locating System", Quuppa, Retrieved on Jul. 17, 2020, Webpage available at: https://quuppa.com/.
Schwarf et al., "Discriminative Human Full-Body Pose Estimation from Wearable Inertial Sensor Data", Lecture Notes in Computer Science, vol. 5903, 2009, pp. 159-172.
Paul et al., "MobileRF: A Robust Device-free Tracking System Based on a Hybrid Neural Network Hmm Classifier", Proceedings of the ACM International Joint Conference on Pervasive and Ubiquitous Computing, 2014, pp. 1-34.
Wang et al., "Interacting with Soli: Exploring Fine-grained Dynamic Gesture Recognition in the Radio-frequency Spectrum", Proceedings of the 29th Annual Symposium on User Interface Software and Technology, Oct. 2016, pp. 851-860.
Palipana et al., "Recent Advances in RF-based Passive Device-free Localisation for Indoor Applications", Ad Hoc Networks, vol. 64, 2017, pp. 80-98.
Ohara et al., "Detecting State Changes of Indoor Everyday Objects using Wi-Fi Channel State Information", Proceedings of the ACM on Interactive, Mobile, Wearable and Ubiquitous Technologies, vol. 1, No. 3, Article: 88, Sep. 2017, pp. 88:1-88:28.
Extended European Search Report received for corresponding European Patent Application No. 19190962.1, dated Nov. 11, 2019, 10 pages.
Meng et al., "The Sixth Sense with Artificial Intelligence: An Innovative Solution for Real-Time Retrieval of the Human Figure Behind Visual Obstruction", Computer Science, Mathematics, ArXiv, 2019, 12 pages.
Yao et al., "Aegis: An Interference-Negligible RF Sensing Shield", INFOCOM—IEEE Conference on Computer Communications, 2018, pp. 1718-1726.
Qiao et al., "PhyCloak: Obfuscating Sensing from Communication Signals", 13th USENIX Symposium on Networked Systems Design and Implementation, 2016, pp. 685-699.

* cited by examiner

SECURE RADIO FREQUENCY-BASED IMAGING

FIELD

Embodiments of the present invention relate in general to secure imaging and more specifically, to secure Radio Frequency, RF, -based imaging.

BACKGROUND

Radio signals, for example on frequencies between 2.4 GHz and 5 GHz, reflect off human bodies, thereby enabling Radio Frequency, RF, -based imaging, such as user identification and pose estimation. RF-based imaging provides various advantages. For instance, RF-based imaging provides advantages related to privacy as a resolution of RF-based imaging is inherently low and thus, faces of users typically cannot be identified. Security of RF-based imaging may be an issue though, e.g., if an unauthorized party is able to steal sensor data related to reflections of RF signals associated with a user, the unauthorized party may be able to recreate imaging information related to the user, such as an image, a pose or a location of the user. There is therefore a need to provide improved methods, apparatuses and computer programs which enable secure RF-based imaging.

SUMMARY OF THE INVENTION

According to a first aspect, there is provided a method for secure imaging using radio frequency signals, comprising, transmitting by a wireless device, during a first phase, i.e., a training phase, a first probe signal associated with a user and receiving a reflected version of the first probe signal, transmitting by the wireless device, during the first phase, the reflected version of the first probe signal to a ground truth classifier, transmitting by the wireless device, during a second phase, i.e., a usage phase, a second probe signal associated with the user and receiving a reflected version of the second probe signal and transmitting by the wireless device, during the second phase, the reflected version of the second probe signal to a trusted apparatus.

According to the first aspect, the wireless device may comprise the trusted apparatus.

According to the first aspect, the method may comprise transmitting the reflected version of the second probe signal to the trusted apparatus over a communication link.

According to the first aspect, the method may comprise receiving from the ground truth classifier during the first phase, by the trusted apparatus, the reflected version of the first probe signal and initial imaging information of the user associated with the reflected version of the first probe signal, setting, during the first phase, by the trusted apparatus, the initial imaging information of the user as the ground truth, receiving by the trusted apparatus, during the second phase, the reflected version of the second probe signal and determining by the trusted apparatus, during the second phase, imaging information related to the user based on the received reflected version of the second probe signal and the ground truth.

According to the first aspect, the method may comprise determining a privacy level of the reflected version of the second probe signal and adjusting at least one setting of at least one Radio Frequency, RF, transceiver based on the determined privacy level. In some embodiments, the privacy level of the reflected version of the second probe signal may correspond to likelihood that imaging information related to the user can be determined correctly by an unauthorized malicious party.

In some embodiments, the wireless device may comprise one of the at least one RF transceiver. The method may also comprise determining that the privacy level is above the threshold and in response to determining that the privacy level is above the threshold, setting a transmission power of a third probe signal lower compared to a transmission power of the second probe signal. Alternatively, or in addition, the method may comprise determining that the privacy level is below the threshold and in response to determining that the privacy level is below the threshold, setting a transmission power of a third probe signal higher compared to a transmission power of the second probe signal.

In some embodiments, the at least one RF transceiver may comprise an external RF source. The method may also comprise determining that the privacy level is above the threshold, determining a current transmission power of the external RF source and in response to determining that the privacy level is above the threshold, setting a transmission power of the external RF source lower compared to the current transmission power of the external RF source. Alternatively, or in addition, the method may comprise determining that the privacy level is below the threshold, determining a current transmission power of the external RF source and in response to determining that the privacy level is below the threshold, transmitting a command to the external RF source to use a higher transmission power higher compared to the current transmission power of the external RF source.

According to a second aspect of the present invention, there is provided an apparatus comprising at least one processing core, at least one memory including computer program code, at least one memory and the computer program code being configured to, with the at least one processing core, cause the apparatus at least to perform the method. In some embodiments, the apparatus may be a wireless device.

The at least one memory and the computer program code may be configured to, with the at least one processing core, cause the apparatus at least to perform, transmit, during a first phase, i.e., a training phase, a first probe signal associated with a user and receive a reflected version of the first probe signal, transmit, during the first phase, the reflected version of the first probe signal to a ground truth classifier, transmit, during a second phase, i.e., a usage phase, a second probe signal associated with the user and receiving a reflected version of the second probe signal and transmit, during the second phase, the reflected version of the second probe signal to a trusted apparatus.

According to a third aspect of the present invention, there is provided an apparatus comprising means for performing the method. The apparatus may comprise means for transmitting, during a first phase, i.e., a training phase, a first probe signal associated with a user and means for receiving a reflected version of the first probe signal, means for transmitting, during the first phase, the reflected version of the first probe signal to a ground truth classifier, means for transmitting, during a second phase, i.e., a usage phase, a second probe signal associated with the user and means for receiving a reflected version of the second probe signal and means for transmitting, during the second phase, the reflected version of the second probe signal to a trusted apparatus. In some embodiments, the apparatus may be a wireless device.

According to a fourth aspect of the present invention, there is provided a non-transitory computer readable medium having stored thereon a set of computer readable instructions that, when executed by at least one processor, cause an apparatus to perform the first method. In some embodiments, the apparatus may be a wireless device.

According to a fifth aspect of the present invention, there is provided a computer program configured to perform the first method.

EMBODIMENTS

Figure 1:
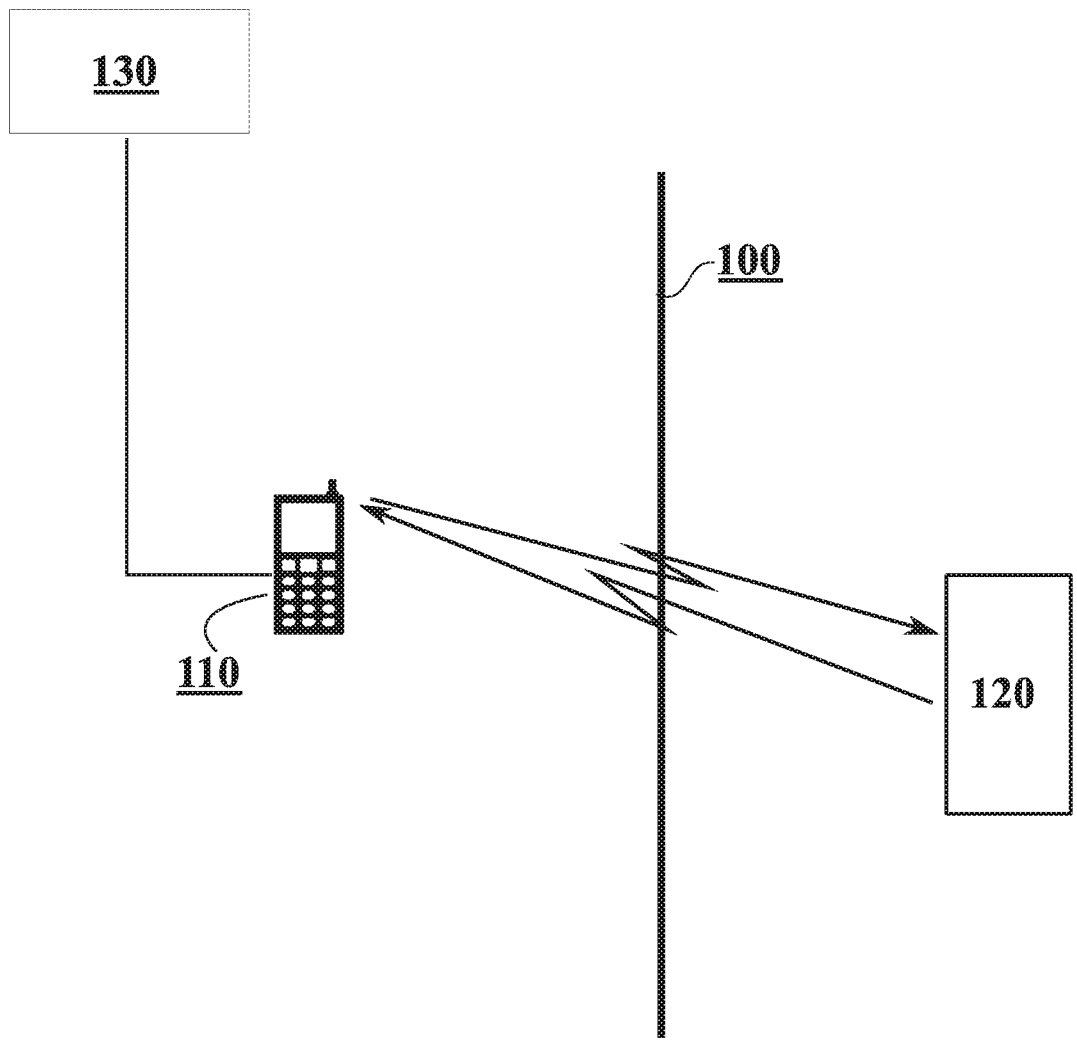
FIG. 1 illustrates an exemplary scenario in accordance with at least some embodiments of the present invention.

Embodiments of the present invention relate to secure Radio Frequency, RF, -based imaging More specifically, embodiments of the present invention enable protection against malicious, unauthorized parties that would like to find out imaging information related to a user, such as an image, a location and/or a pose of the user. Protection can be achieved by using a ground truth classifier and a trusted apparatus for determining imaging information related to the user.

A wireless device may collect reflected versions of transmitted RF probe signals and transmit said reflected versions of RF probe signals to the ground truth classifier. The trusted apparatus may then be trained by the ground truth classifier using predicted imaging information related to the user. The predicted imaging information may be set as a ground truth. During a usage phase, the trusted apparatus may receive reflected versions of RF probe signals from the wireless device that collected said reflected versions of RF probe signals. Finally, the trusted apparatus may determine imaging information related to the user, such as an image, a location and/or a pose of the user, based on the received reflected versions of RF probe signals and the ground truth.

RF-based imaging may be exploited in various use cases. For instance, RF-based imaging enables imaging even if there is no line-of-sight connection between a device performing the imaging and a user, i.e., an object of the imaging, to determine imaging information related to the user. In general, the imaging information related to the user may comprise data describing an image, a location and/or a pose of the user, for example the user's position within a pre-defined coordinate system, a skeleton model of the user's body (limbs, joints, head, etc.) and so forth. RF-based imaging typically does not enable recognizable capturing of faces for example, thereby enabling privacy of users. RF-based imaging may be used for various applications, such as health and safety applications, smart home monitoring, security and in-vehicle monitoring. RF-based imaging may be used for example on Wi-Fi frequencies, e.g., frequencies between 2.4 GHz and 5 GHz, because signals on such frequencies reflect off human bodies.

There are various challenges related to the use of RF-based imaging though. For instance, imaging information related to a user may be protected using various methods based on data encryption and/or secure authentication, but such solutions have problems as there are many possible attack vectors. For example, some attacks may be specifically aimed at weaknesses in the way a system interfaces, or communicates, with a user. Passwords or other security factors may be compromised, e.g., due to fishing attacks, guessing of standard passwords, brute force attack on weak passwords, etc. Moreover, a data gathering device, such as a wireless device, may be sniffed or hacked, or data may be stolen and decrypted, etc.

Embodiments of the present invention therefore improve security of RF-based imaging For instance, according to some embodiments, data analysis (e.g., generation of imaging information) may be separated from a device that gathers, or collects, the raw data, such as reflected versions of probe signals. Consequently, it is possible to provide protection against a malicious party being able to determine imaging information related to a user, such as an image, a pose or a location of the user, from an intercepted reflected version of a probe signal.

That is to say, data analysis may be performed for example by a trusted apparatus while a wireless device may collect the raw data, such as reflected versions of RF probe signals. Thus, even in a case of a data breach, or even if the device that gathers the raw data is compromised, the gathered data cannot be used by a malicious party to generate imaging information, i.e., to convey any information beyond privacy requirements of the user.

For instance, in some embodiments, an antenna system comprising a RF transceiver may be operated in an RF environment under specific settings to create and transmit RF probe signals such that reflected versions of the transmitted RF probe signals may be correctly interpreted after a training phase.

Alternatively, or in addition, at least one external RF source, i.e., RF emitting device, may be operated in the RF environment under specific settings to modify the RF environment so that the reflected versions of the RF probe signals may be only interpreted correctly after the training phase. Thus, some embodiments of the present invention may be used to prevent another security hazard, wherein data is gathered by an unauthorized eavesdropping device. For instance, external RF sources may be used to generate a RF background profile. In some embodiments, various external RF sources may be used to create RF background signals to sufficiently mask reflected versions of RF probe signals, thereby making it very difficult, if not impossible, for an unauthorized eavesdropper to obtain information beyond privacy requirements of the user. At the same time, the imaging system may optimally track or image the use, because the external RF sources may be controlled by the imaging system. Knowledge of the external RF sources may then be used for training the system, e.g., in a neural network, to outperform an unauthorized, malicious party using a general classifier without having information about external RF sources. Thus, the system would be able to still perform some, perhaps basic, imaging related to the user whilst ensuring that the unauthorized, malicious party would not be able to deduce any useful imaging information.

FIG. 1 illustrates an exemplary scenario in accordance with at least some embodiments of the present invention.

The exemplary scenario of FIG. 1 may comprise wall 100 and wireless device 110. In general, wireless device 110 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable mobile or fixed wireless terminal or station.

Wireless device 110 may transmit a probe signal, i.e., RF probe signal, over air interface through wall 100. The exemplary scenario may also comprise user 120. User 120 may also be referred to as an object, e.g., an object for RF-based imaging In response to transmitting the probe signal, wireless device 110 may receive a reflected version of the transmitted probe signal over the air interface. The reflected version of the transmitted probe signal may be reflected from user 120.

FIG. 1 demonstrates the operation according to some embodiments of the present invention during a usage phase, wherein wireless device 110 may transmit the reflected version of the probe signal to trusted apparatus 130 over a communication link. The communication link may a wired or a wireless link. In some embodiments, wireless device 110 and trusted apparatus may be separate devices. However, in some embodiments of the present invention, wireless device 110 may comprise trusted apparatus 130. Thus, the reflected version of the transmitted probe signal may be transmitted within wireless device 110 as well, if trusted apparatus 130 is a subsystem within wireless device 110.

According to some embodiments, wireless device 110 may be an in-door location and/or activity tracker based on reflected versions of transmitted probe signals, i.e., RF reflectance signals, wherein the signals may only be read by an image reconstruction classifier, such as a RF reflectance classifier, characteristic to the imaging system and its environment. A privacy sensitive imaging system, such as a camera or a generic user tracking system, may be used only in a setup, i.e., training, phase during which the image reconstruction classifier may be trained to reconstruct imaging information, such as an image or a location, from a given reflected version of a transmitted probe signal. This image reconstruction ability may be accessible only on a trusted apparatus, such as a safe mobile or fixed device.

Figure 2:
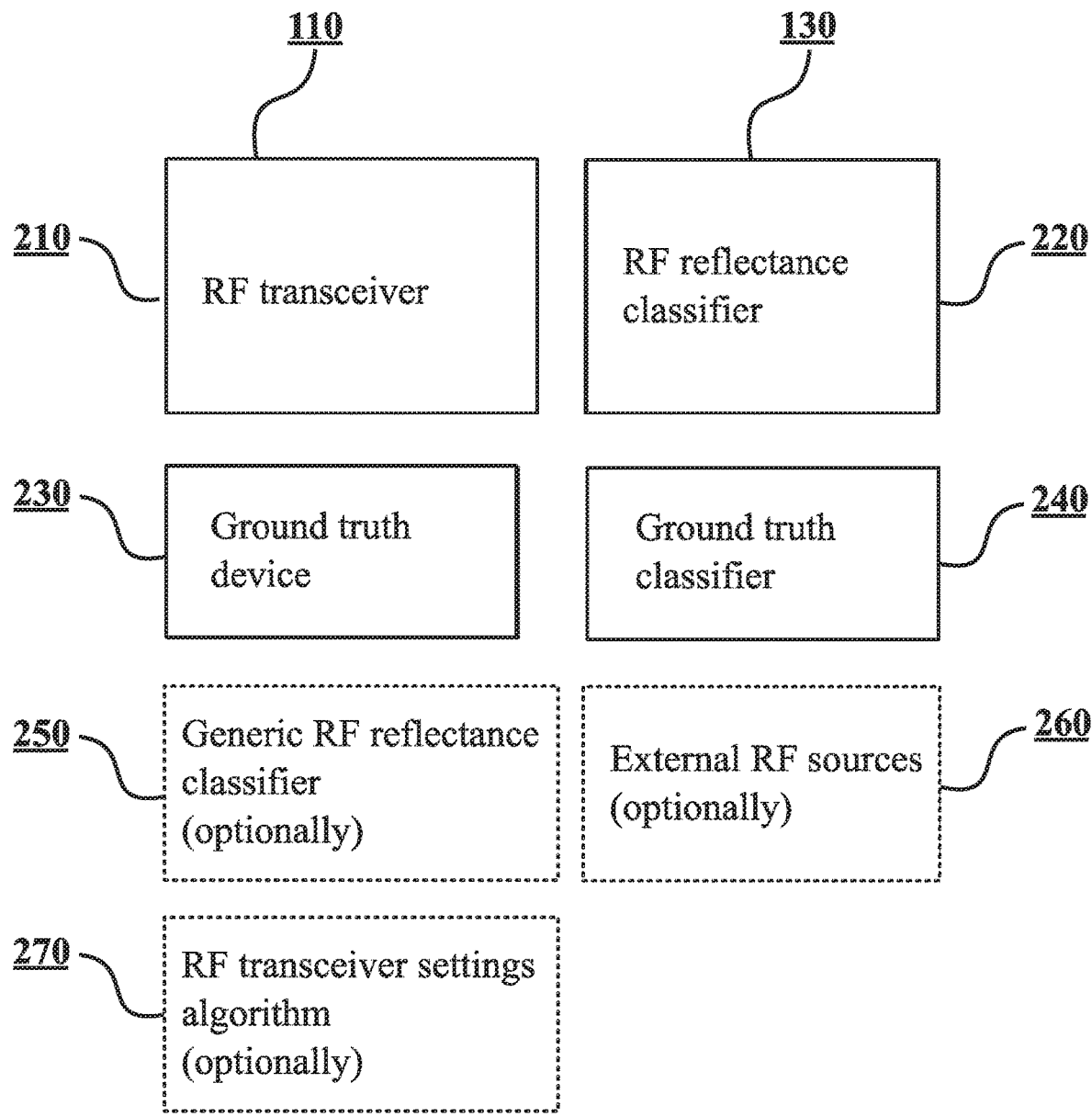
FIG. 2 illustrates an exemplary RF-based imaging system in accordance with at least some embodiments of the present invention.

FIG. 2 illustrates an exemplary RF-based imaging system in accordance with at least some embodiments of the present invention. The exemplary RF-based imaging system of FIG. 2 may comprise wireless device 110 and trusted apparatus 130 of FIG. 1. As shown in FIG. 2, wireless device 110 may comprise RF transceiver 210. RF transceiver 210 may comprise a RF antenna system for transmitting radio signals, such as RF probe signals, and receiving reflections of the transmitted radio signals from various objects, i.e., surfaces. As an example, Frequency Modulated Continuous Wave, FMCW, may be employed for measuring a distance from wireless device 110 to an object, such as user 120 in FIG. 1.

In some embodiments, RF transceiver 210 may comprise an antenna array and the antenna array may be employed for measuring spatial direction between wireless device 110 and the object, such as user 120. In addition, RF transceiver 210 may be operated under certain settings, such as a bandwidth of a FMCW signal, aperture of the antenna array, sampling rate and/or transmission power. Trusted apparatus 130 may be referred to as a trusted subsystem as well.

The exemplary RF-based imaging system of FIG. 2 may also comprise RF reflectance classifier 220. RF reflectance classifier 220 may determine imaging information related to user 120. For instance, RF reflectance classifier 220 may comprise a pose estimation algorithm for determining a static or a dynamic pose of user 120 based on reflected versions of probe signals, i.e., RF reflectance signals. RF reflectance classifier 220 may receive the reflected versions of the probe signals from RF transceiver 210 and use the received reflected versions of probe signals as an input for determining imaging information, such as a static or a dynamic pose of user 120.

In some embodiments, RF reflectance classifier 220 may require training for a specific environment it is being operated in. For instance, characteristics of a specific environment that are taught to RF reflectance classifier 220 may comprise RF background noise generated by other wireless devices in the environment, surfaces or objects reflecting RF signals, etc.

RF reflectance classifier 220 may be stored on a trusted subsystem, such as trusted apparatus 130. That is to say, trusted apparatus 130 may comprise RF reflectance classifier 220. In some embodiments, RF reflectance classifier 220 may be stored on a secure module within wireless device 130. Thus, wireless device 110 may comprise trusted apparatus 130 and RF reflectance classifier 220.

The exemplary RF-based imaging system of FIG. 2 may also comprise ground truth device 230. Ground truth device 230 may collect a dataset, i.e., a ground truth dataset, associated with user 120 of FIG. 1. The dataset associated with user 120 may be gathered based on signals reflected from user 120 and the dataset may be used for extracting initial imaging information related to user 120, such as a location or a pose of user 120, by ground truth device 230. That is to say, ground truth device 230 may determine initial imaging information related to user 120 from the ground truth dataset. In general, ground truth may refer to information that has been collected by direct observation.

Examples of ground truth device 230 and corresponding ground truth datasets comprise at least the following. For instance, ground truth device 230 may comprise a camera or an image sensor. In such a case a captured photo or video of user 120 may be referred to as the ground truth dataset and ground truth device 230 may be incorporated in a personal user device, e.g. smartphone or tablet, or a user monitoring device, e.g. a security camera, patient monitor or baby monitor. In some embodiments, ground truth device 230 may comprise a depth camera or a motion tracking device and in such a case a captured depth map of a body of user 120 may be referred to as the ground truth dataset.

Moreover, in some embodiments, ground truth device 230 may comprise a motion sensor or a position tag for body tracking. Thus, ground truth device 230 may be on the body of user 120 and ground truth device 230 may capture information related to acceleration and/or orientation of the body, or a part of the body, of user 120 to which a motion sensor or a position tag is attached. Thus, said information related to acceleration and/or orientation of the body, or a part of the body, of user 120 may be referred to as the ground truth dataset. As an example, body tracking methods using sensor may comprise real-time tracking of Bluetooth Low Energy, BLE, tags and devices and motion tracking using other wearable sensors, such as accelerometers or gyroscopes embedded in wearable devices, e.g., as those used for fall detection of elderly.

In some embodiments, RF transceiver 210 or some other RF antenna system may comprise ground truth device 230. That is to say, for example wireless device 110 may comprise ground truth device 230. In such a case, the ground truth dataset may comprise reflected versions of probe signals, i.e., RF reflectance signals, that have been created under standard, i.e., generally known, RF transceiver settings. Therefore, the reflected versions of the probe signals may be transformed into imaging information related to user 120, such as a pose of user 120, using generic RF reflectance classifier 250.

The exemplary RF-based imaging system of FIG. 2 may also comprise ground truth classifier 240. Ground truth classifier 240 may determine imaging information related to user 120 based on the ground truth data set. For instance, ground truth classifier 240 may comprise a pose estimation algorithm for determining a static or a dynamic pose of user 120 based on the ground truth dataset. Ground truth classifier 240 may receive the ground truth dataset from ground truth device 230 and use the received ground truth dataset as an input for determining imaging information related to user 120.

In some embodiments, the exemplary RF-based imaging system of FIG. 2 may also comprise generic RF reflectance classifier 250. Generic RF reflectance classifier 250 may determine generic imaging information related to user 120 based on reflected versions of probe signals. For instance, wireless device 110 and/or trusted apparatus 130 may comprise generic RF reflectance classifier 250. In some embodiments, generic RF reflectance classifier 250 may be assumed to be available to at least one unauthorized, malicious party. Generic RF reflectance classifier 250 may be an algorithm which is capable of deducing imaging information related to user 120, such as a pose of user 120, from a given reflected version of a probe signal, i.e., from a given RF reflectance signal. Thus, if the given RF reflectance signal is of a good quality and not for example masked by other RF signals, such as RF background created by external RF sources, anyone may potentially extract said imaging information related to user 120 from the given RF reflectance signal using generic RF reflectance classifier 250.

Generic RF reflectance classifier 250 may comprise a pose estimation algorithm for determining a generic pose of user 120 based on reflected versions of probe signals that are received when RF transceiver 210 is operating under specific RF transceiver settings and in a specific environment, i.e., standard RF transceiver settings. Generic RF reflectance classifier 250 may not require training for a specific environment it is being operated in. That is to say, generic RF reflectance classifier 250 may take a reflected version of a probe signal as an input and determine a pose of user 120 from the reflected version of the probe signal without having any knowledge of the specific environment. Generic RF reflectance classifier 250 may be pre-trained in a different setting and it may be any open source algorithm.

That is to say, it may be assumed the use of the standard RF transceiver settings is enough for extracting sufficient amount of information from the reflected versions of the probe signals, for determining imaging information related to user 120 to a reasonable extent. So generic RF reflectance classifier 250 may be used for example in a certain location, wherein a RF background profile is known to a reasonable extent.

Generic RF reflectance classifier 250 may be used during a usage phase, e.g., to test if the gathered data, such as reflected versions of probe signals, are sufficiently difficult to analyze for a potential attacker. In other words, generic RF reflectance classifier 250 may be used to test a privacy level of the gathered data.

However, generic RF reflectance classifier 250 may not be able to determine imaging information related to user 120, such as a pose of user 120, from the reflected versions of the probe signals, i.e., the RF reflectance signal, under different conditions, such as if the used RF transceiver settings are different compared to the standard RF transceiver settings, e.g., if a transmission power of a probe signal is below a certain threshold or a reflected version of the probe signal is below a certain time resolution or a RF background profile is different than expected, possibly due to external RF sources 260. In some embodiments, wireless device 110 may comprise generic RF reflectance classifier 250.

So in some embodiments, the exemplary RF-based imaging system of FIG. 2 may also comprise external RF sources 260. External RF sources 260 may be referred to RF transceivers, or emitters, in general. External RF sources 260 may comprise additional wireless device (other than wireless device 110) which may be operated by the exemplary RF-based imaging system of FIG. 2 to transmit RF signals, thereby creating a RF background profile. The RF background profile may be exploited for reducing quality of the received reflected versions of the probe signals, i.e., detected RF reflectance signals. For instance, external RF sources 260 may have various settings, such as signal power, direction and bandwidth, which can influence the received reflected versions of the probe signals. Consequently, external RF sources 260 may have an impact on a privacy level of the received reflected versions of the probe signals in different ways.

In some embodiments, the exemplary RF-based imaging system of FIG. 2 may also comprise RF transceiver settings algorithm 270. RF transceiver settings algorithm 270 may determine the privacy level for a given reflected version of a probe signal, i.e., calculate a score or a value for the given reflected version of a probe signal. The privacy level may be related to how well imaging information related to user 120, such as a pose of user 120, may be predicted from the given reflected version of the probe signal, e.g., by using generic RF reflectance classifier 250. That is to say, the privacy level may refer to a likelihood, or a degree, that imaging information related to user 120 may be determined correctly from the given reflected version of the probe signal, possibly by an unauthorized malicious party, without knowing the settings of RF transceiver 210 that have been actually used and/or the RF background profile created by external RF sources 260. For example, the privacy level may refer to a degree of spatial resolution required for determining a position of user 120. Alternatively, or in addition, RF transceiver settings algorithm 270 may determine optimal settings for RF transceiver 210 and/or optimal settings for external RF sources 260, if needed for changing the privacy level to a desired value. In some embodiments, trusted apparatus 130 may comprise RF transceiver settings algorithm 270, but also other locations are possible for RF transceiver settings algorithm 270.

Figure 3:
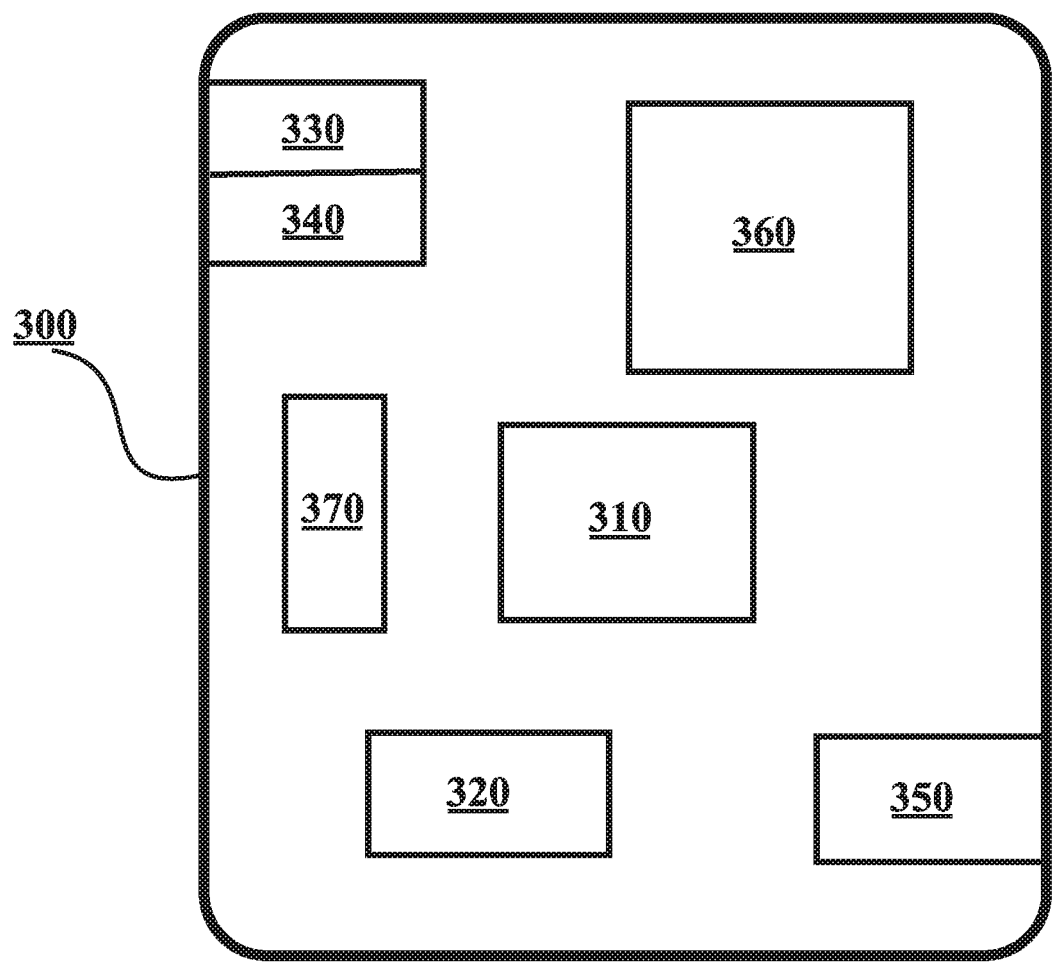
FIG. 3 illustrates an example apparatus capable of supporting at least some embodiments of the present invention.

FIG. 3 illustrates an example apparatus capable of supporting at least some embodiments of the present invention. Illustrated is device 300, which may comprise or be incorporated in, e.g., wireless device 110 or trusted apparatus 130 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor.

Processor 310 may comprise at least one Application-Specific Integrated Circuit, ASIC. Processor 310 may comprise at least one Field-Programmable Gate Array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, 5G, Long Term Evolution, LTE, IS-95, New Radio, NR, Wireless Local Area Network, WLAN, Ethernet and/or Worldwide Interoperability for Microwave Access, WiMAX, standards, for example.

Device 300 may comprise a Near-Field Communication, NFC, transceiver 350. NFC transceiver 350 may support at least one NFC technology, such as NFC, Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
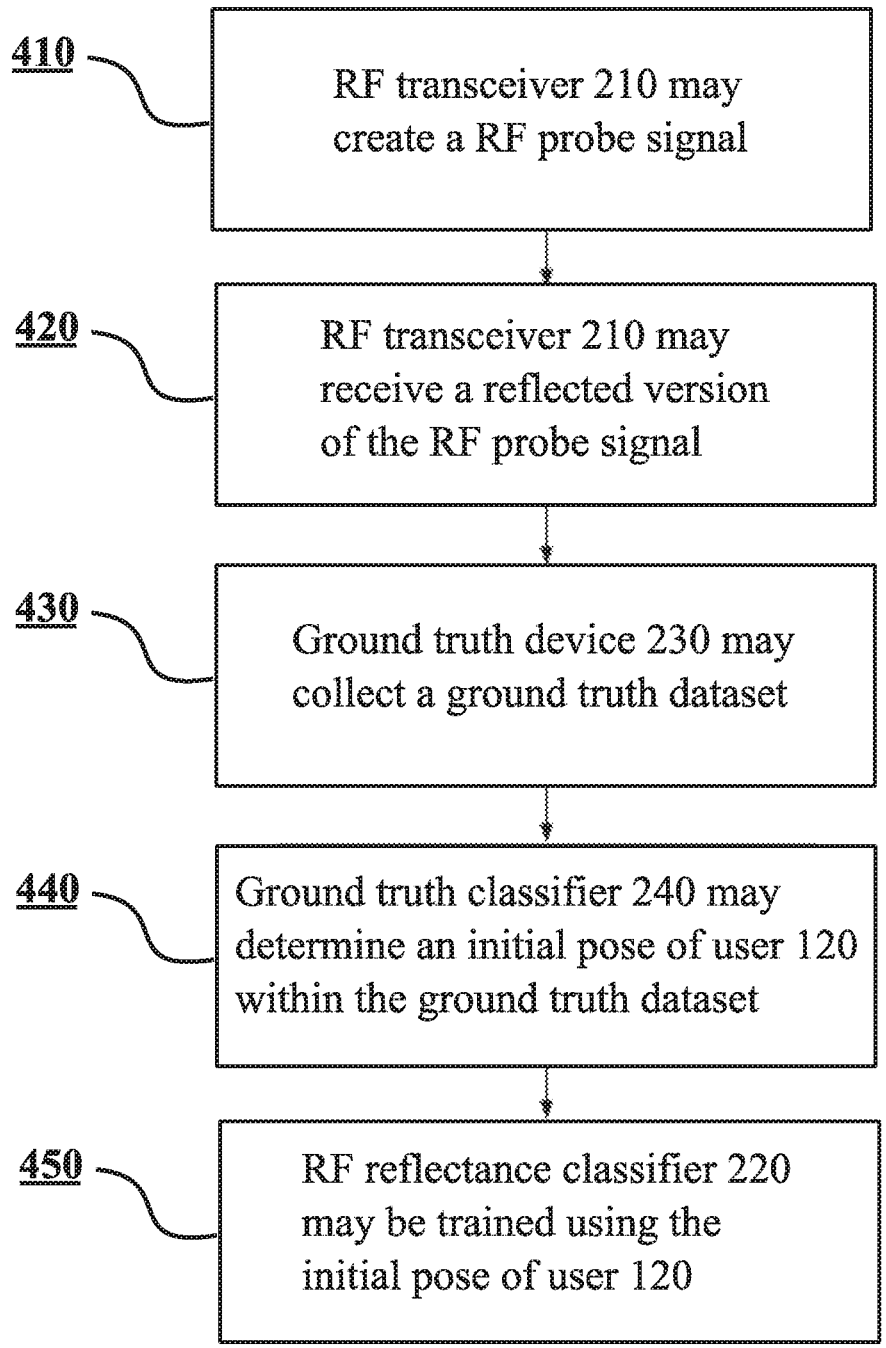
FIG. 4 illustrates a first process in accordance with at least some embodiments of the present invention.

FIG. 4 illustrates a first process in accordance with at least some embodiments of the present invention. Steps of the first process are denoted by 410-450 in FIG. 4. The first process may be referred to as a training phase which takes place before using phases. Even though a pose of user 120 is used as an example of imaging information in relation to the first process, the first process may be generalized to cover any other imaging information as well, such as a location of user 120 or an image of user 120.

At step 410, RF transceiver 210 may create, or generate, and transmit a first probe signal such as an RF probe signal. An example description of how a low power RF probe signal may be constructed using antenna arrays and FMCW chirp can be found for example from "Adib, F., Hsu, C., Mao, H., Katabi, D., Durand, F. 2015. Capturing the Human Figure Through a Wall. ACM Trans. Graph.34, 6, Article 219 (November 2015), 13 pages. DOI=10.1145/2816795.2818072 http://doi.acm.org/10.1145/2816795.2818072".

At step 420, RF transceiver 210 may receive a reflected version of a first transmitted probe signal, i.e., RF transceiver 210 may collect the first RF reflectance signal. An example description of how the first RF reflectance signal may be collected can also be found "Adib, F., Hsu, C., Mao, H., Katabi, D., Durand, F. 2015. Capturing the Human Figure Through a Wall. ACM Trans. Graph.34, 6, Article 219 (November 2015), 13 pages. DOI=10.1145/2816795.2818072 http://doi.acm.org/10.1145/2816795.2818072". So as an example, the reflected version of the first transmitted probe signal may be created by determining a spatial direction of the reflected signal to form a spatial heat map as calculated by post-processing beamforming, by creating a spatial depth map by calculating a Time-of-Flight, ToF, of a reflected FMCW chirp into the various spatial directions and/or using other post-processing techniques such as denoising and background subtraction.

Step 430 may be performed with step 420. At step 430, ground truth device 230 may collect a ground truth dataset. The ground truth dataset may be collected over time and the dynamic evolution of the ground truth dataset may be time-stamped, or otherwise synchronized with collection of the received versions of the probe signals, i.e., RF reflectance signals. For instance, ground truth device 230 may collect the ground truth data by collecting data of user 120 as a part of normal operation of a user monitoring device. Alternatively, or in addition, ground truth device 230 may collect data of user 120 during a dedicated training procedure, wherein a personal device may be used to instruct user 120 about how a camera should be positioned, or set up, and potentially what kind of movements of user 120 and/or a location of user 120 are required during the dedicated training procedure.

In some embodiments, RF transceiver 210 may be operated, during a training phase, under settings that result in clear reflected versions of first probe signals, the clear reflected versions of the first probe signals being such that those may be read by anyone. The clear reflected versions of the first probe signals may be used to determine a ground truth. RF transceiver 210 may be operated using changed RF transceiver settings during the training phase as well, thereby resulting in a ground truth dataset being created using a masked/hidden reflected versions of the first probe signals, i.e., RF reflectance signals. Thus, the masked/hidden reflected versions of first probe signals may not be read easily by anyone.

Then, RF transceiver 210 may be operated using said changed RF transceiver settings, during a usage phase, to create masked/hidden reflected versions of second probe signals. As the system has been trained using the masked/hidden reflected versions of the first probe signals, the system may extract a pose of user 120 from the masked/hidden reflected versions of the second probe signals. The masked/hidden reflected version of the first and the second probe signals may be taken under different RF transceiver settings of RF transceiver 210, such as higher power, higher spatial/temporal resolution, compared to RF transceiver setting initially used at step 410.

Steps 420 and 430, i.e., collection of the reflected version of the first probe signal and the corresponding ground truth dataset may be repeated under various conditions, thereby enabling more robust learning against signal variations associated with these various conditions. As an example, such various conditions may comprise different users 120, different locations of users 120 (e.g., different rooms in a house), different movements of users 120, different times (e.g., signal quality may change over time due to time-variations in a RF background profile), different RF transceiver settings and/or different RF background profiles (e.g., caused by different transmission from external RF sources 270).

At step 440, Ground truth classifier 240 may predict an initial static or a dynamic pose of user 120 within the ground truth dataset. In some embodiments, ground truth classifier 240 may predict the initial static or a dynamic pose of user 120 within the ground truth dataset by using a pose estimation algorithm, e.g., a neural network that has been pre-trained to classify sensor readings of ground truth device 230. The pose estimation algorithm may also extract a pose of user 120 using variables such as a skeletal pose and a location of user 120. In some embodiments, the location of user 120 may refer to a distance to ground truth device 230 or a location within an indoor positioning coordinate system.

At step 450, RF reflectance classifier 220 may be trained using the initial pose of user 120 as the ground truth. That is to say, the predicted pose of user 120 may be transmitted from ground truth classifier 240 to trusted apparatus 130 and upon receiving the initial pose of user 120, trusted apparatus 130 may set the predicted pose of user 120 as the ground truth. An example description of how to train RF reflectance classifier 220 by cross-modal supervision using a teacher-student neural network architecture can also be found from "Adib, F., Hsu, C., Mao, H., Katabi, D., Durand, F. 2015. Capturing the Human Figure Through a Wall. ACM Trans. Graph.34, 6, Article 219 (November 2015), 13 pages. DOI=10.1145/2816795.2818072 http://doi.acm.org/10.1145/2816795.2818072".

RF reflectance classifier 220 may require access to both, the reflected version of the first probe signal and the ground truth during a training phase. In some embodiments, trusted apparatus 130 may comprise RF reflectance classifier 220 during the training phase, but it is not mandatory. Nevertheless, trusted apparatus 130 may comprise RF reflectance classifier 220 during a usage phase in any case, to enable secure operation.

Figure 5:
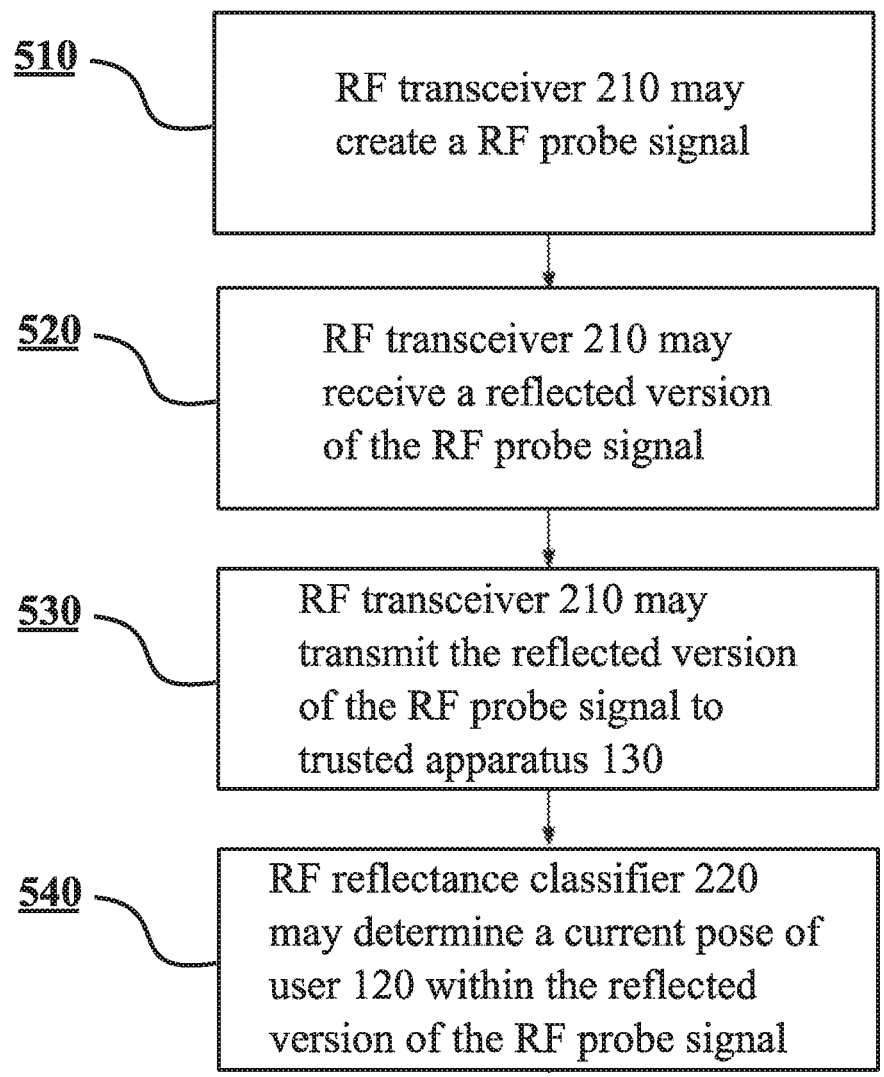
FIG. 5 illustrates a second process in accordance with at least some embodiments of the present invention.

FIG. 5 illustrates a second process in accordance with at least some embodiments of the present invention. Steps of the second process are denoted by 510-540 in FIG. 5. The second process may be referred to as a usage phase for imaging which takes place after the training phase of FIG. 4. Even though a pose of user 120 is used as an example of imaging information in relation to the second process, the second process may be generalized to cover any other imaging information as well, such as a location of user 120 or an image of user 120.

Similarly as at step 410 of the first process of FIG. 4, RF transceiver 210 may create, or generate, and transmit a second probe signal, such as an RF Probe Signal, at step 510.

Then, again similarly as at step 420 of the first process of FIG. 4, RF transceiver 210 may receive a reflected version of the transmitted second probe signal at step 520, i.e., RF transceiver 210 may collect a second RF reflectance signal.

At step 530, RF transceiver 210 may transmit the received reflected version of the transmitted second probe signal to trusted apparatus 130, i.e., to a trusted subsystem. That is to say, the raw RF reflectance signal may be transmitted to trusted apparatus 130. It should be noted that the received reflected version of the transmitted second probe signal cannot reliably be transformed into a pose of user 120 without RF reflectance classifier 220. Thus, security can be ensured if the received reflected version of the transmitted second probe signal is captured by a malicious party, e.g., by hacking RF transceiver 210 or through intercepting the transmission of the received reflected version of the transmitted second probe signal.

At step 540, RF reflectance classifier 220 may determine a current pose of user 120 based on the received reflected version of the second probe signal and the ground truth, wherein the ground truth may be based on the predicted pose of user 120 received from ground truth classifier 240. An example description of how RF reflectance classifier 220 may determine a pose of user 120 can also be found from "Adib, F., Hsu, C., Mao, H., Katabi, D., Durand, F. 2015. Capturing the Human Figure Through a Wall. ACM Trans. Graph.34, 6, Article 219 (November 2015), 13 pages. DOI=10.1145/2816795.2818072 http://doi.acm.org/10.1145/2816795.2818072".

Therefore, security may be ensured because trusted apparatus 130, i.e., the trusted subsystem comprises RF reflectance classifier 220 and consequently, a current pose of user 120 may be determined within a secure environment, and without transmitting the pose of user 120 over a wireless communication channel. The current pose of user 120, or any imaging information related to user 120 in general, may be formed and determined on trusted apparatus 130 and thus, the current pose of user 120 cannot be intercepted on the imaging apparatus, such as wireless device 110, or while sending the current pose of user 120 to trusted apparatus 130.

Figure 6:
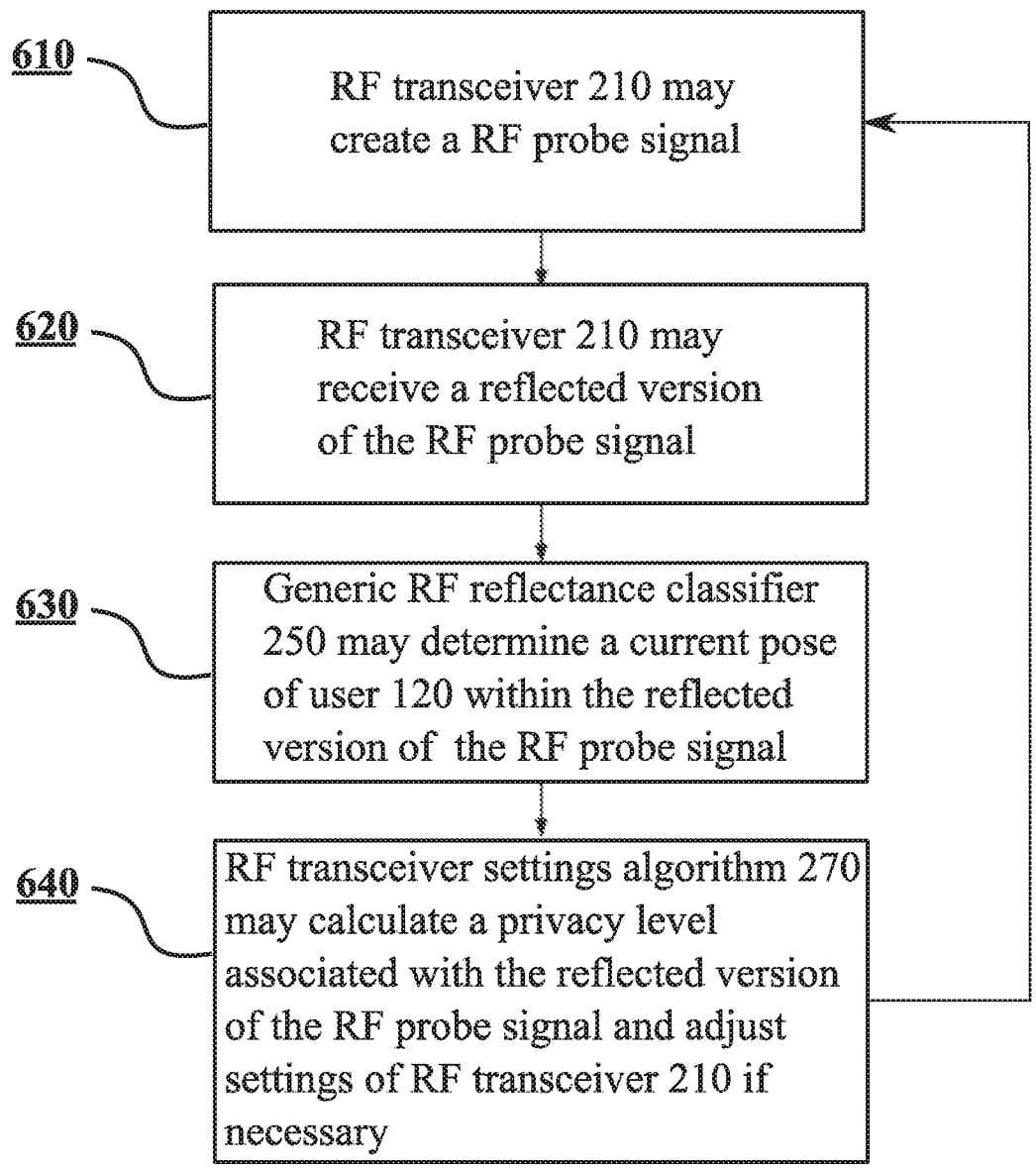
FIG. 6 illustrates a third process in accordance with at least some embodiments of the present invention.

FIG. 6 illustrates a third process in accordance with at least some embodiments of the present invention. Steps of the third process are denoted by 610-640 in FIG. 6. The third process may be referred to as a usage phase related to transceiver settings which takes place after the training phase of FIG. 4. Even though a pose of user 120 is used as an example of imaging information in relation to the third process, the third process may be generalized to cover any other imaging information as well, such as a location of user 120 or an image of user 120.

Similarly as at step 410 of the first process of FIG. 4, RF transceiver 210 may create, or generate, and transmit a second probe signal, such as an RF Probe Signal, at step 610. Then, again similarly as at step 420 of the first process of FIG. 4, RF transceiver 210 may receive a reflected version of the transmitted second probe signal at step 620, i.e., RF transceiver 210 may collect a second RF reflectance signal.

At step 630, generic RF reflectance classifier 250 may predict, i.e., determine a generic pose of user. So at step 630, generic RF reflectance classifier 250 may determine a generic pose of user by 120 assuming RF transceiver 210 is operating under specific RF transceiver setting and in a specific environment, i.e., standard RF transceiver settings, to create a generic pose of user 120. The generic pose of user 120 may thus correspond to a pose of user 120 generated by an unauthorized, malicious party.

At step 640, RF transceiver settings algorithm 270 may calculate a privacy level associated with the received reflected version of the transmitted second probe signal, i.e., the second RF reflectance signal, and adjust settings of RF Transceiver 210 if necessary. As an example, RF transceiver settings algorithm 270 may calculate the privacy level associated with the received reflected version of the transmitted second probe signal by taking the generic pose of user 120 as an input and then determining, or calculating, the privacy level associated with the received reflected version of the transmitted second probe signal, e.g., by assigning a value to variables of interest associated with the pose of user 120. Examples of such variables of interest comprise at least spatial and/or time resolution of an image and/or video reconstruction of user 120, to what extent a location of user 120 may be determined (e.g., which room user 120 is in), ability to determine user presence in general (e.g., motion, breathing, etc.), ability to distinguish between different users 120 and ability to distinguish between activities of users 120.

The privacy level may be determined, for example, by comparing the generic pose of user 120 to a pose of user 120 generated at step 540 of the second process by RF reflectance classifier 220, to find out how much difference there is. Alternatively, or in addition, the privacy level may be determined from intrinsic properties of the generic pose of user 120. Said intrinsic properties of the generic pose of user 120 may comprise, e.g., how limbs and/or body of user 120 are positioned/orientated. Thus, it may be possible to learn from the generic pose of user 120 if user 120 is doing an activity that is considered as private, such as sleeping or showering. Therefore, determining the privacy level from said intrinsic properties may comprise for example determining a likelihood that an unauthorized, malicious party would be able to determine correctly an activity that is considered as private.

In some embodiments, RF transceiver settings algorithm 270 may compare the determined privacy level associated with the received reflected version of the transmitted second probe signal. If it is determined that the determined privacy level associated with the received reflected version of the transmitted second probe signal is above or below the threshold, RF transceiver settings algorithm 270 may decide to change settings of RF transceiver 210. For instance, if the privacy level is above the threshold, RF transceiver settings algorithm 270 may transmit a command to RF transceiver 210, the command indicating a lower transmit power and/or lower spatial/time resolution for a third probe signal. That is to say, RF transceiver settings algorithm 270 may for example determine a current transmission power of RF transceiver 210 and indicate a lower power compared to the current transmission of RF transceiver 210 for the third probe signal.

If it is determined that the determined privacy level associated with the received reflected version of the transmitted second probe signal is below the threshold, RF transceiver settings algorithm 270 may also decide to change settings of RF transceiver 210. For instance, if the privacy level is below the threshold, RF transceiver settings algorithm 270 may transmit a command to RF transceiver 210, the command indicating a lower transmit power and/or lower spatial/time resolution for a third probe signal. That is to say, RF transceiver settings algorithm 270 may for example determine a current transmission power of RF transceiver 210 and indicate a higher power compared to the current transmission of RF transceiver 210 for the third probe signal.

In some embodiments, more fine-grained settings of RF transceiver 210 may be used. For instance, settings of RF transceiver 210 may be adjusted for lower spatial resolution, time resolution, signal-to-noise ratio for specific direction/locations (e.g. rooms), specific user, users in general, and/or user activities. Upon calculating the privacy level and adjusting settings of RF transceiver 210 at step 640, the third process may loop back to step 610 and the third process may be repeated again, until a desired privacy level is achieved, i.e., the determined privacy level is equal to the threshold.

Figure 7:
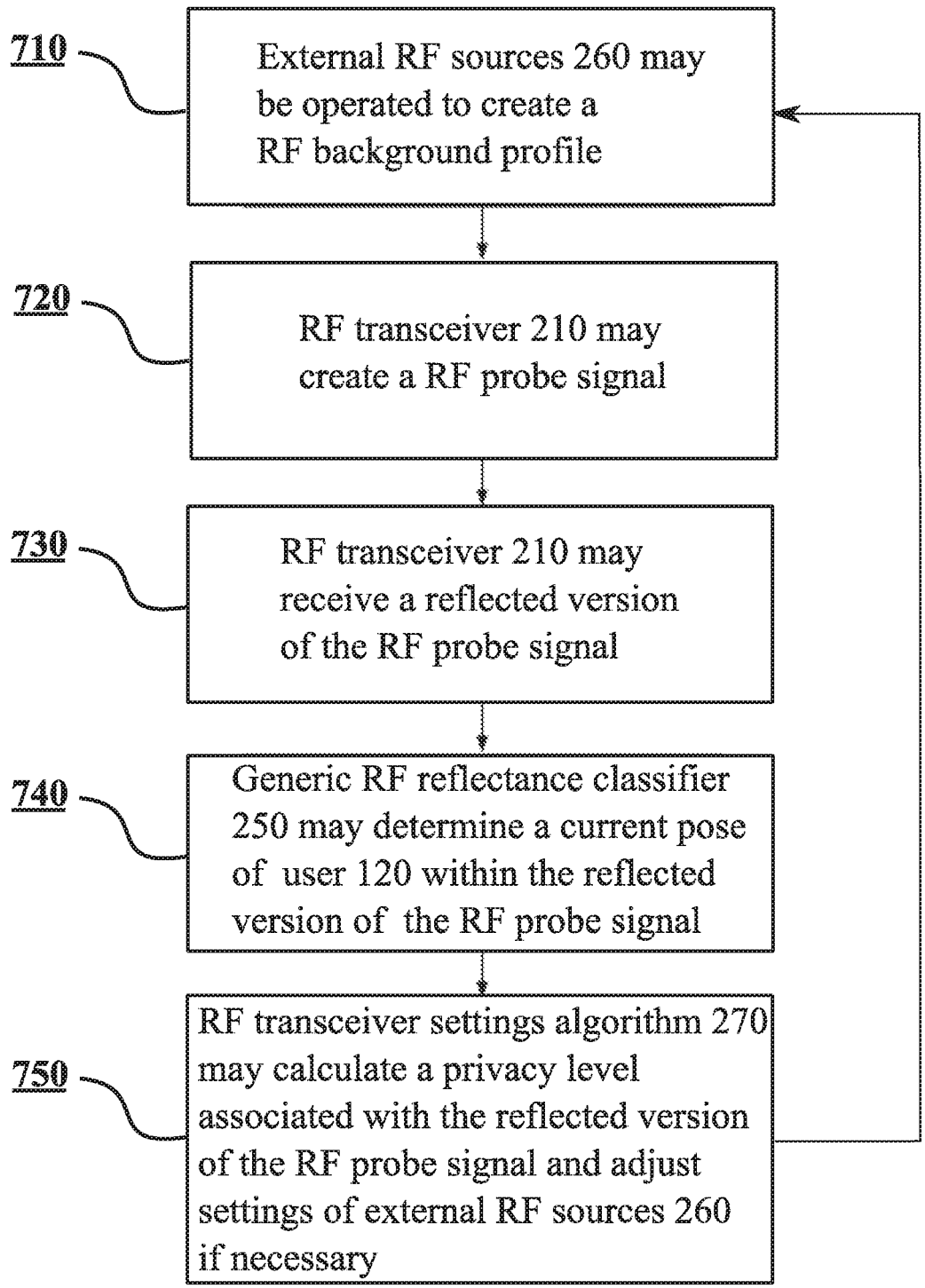
FIG. 7 illustrates a fourth process in accordance with at least some embodiments of the present invention.

FIG. 7 illustrates a fourth process in accordance with at least some embodiments of the present invention. Steps of the fourth process are denoted by 710-750 in FIG. 7. The fourth process may be referred to as a usage phase related to RF a background profile which may take place after the training phase of FIG. 4. Even though a pose of user 120 is used as an example of imaging information in relation to the fourth process, the fourth process may be generalized to cover any other imaging information as well, such as a location of user 120 or an image of user 120.

At step 710, external RF Sources 260 may be operated to create the RF background profile, e.g., to partially or wholly obscure the reflected version of the probe signals transmitted by RF transceiver 210. Alternatively, or in addition, the reflected version of the probe signals received by other RF transceivers than RF transceiver 210 may be altered so that is more difficult to extract the pose of user 120 from the received reflected version of the probe signals.

For instance, signal strength of transmission, i.e., transmission power, of external RF sources 260 may be increased to drown the reflected version of the probe signals transmitted by RF transceiver 210. Alternatively, or in addition, external RF sources 260 may be used to create time-variations in the RF background profile to mimic, or mask, presence and/or movement of user 120.

In some embodiments, a desired RF background profile may be chosen by wireless device 110. The desired RF background profile may be chosen in-line with normal operation of external RF Sources 260, e.g. by scheduling in existing communication tasks. Alternatively, the desired RF background profile may be created with the sole purpose of altering how well the pose of user 120 can be extracted from the received reflected version of the second probe signal.

Similarly as at step 410 of the first process of FIG. 4, RF transceiver 210 may create, or generate, a second probe signal, such as an RF probe signal, at step 720. Then, again similarly as at step 420 of the first process of FIG. 4, RF transceiver 210 may receive a reflected version of the transmitted second probe signal at step 730, i.e., RF transceiver 210 may collect a second RF reflectance signal. At step 740, generic RF reflectance classifier 250 may determine a generic pose of user 120 similarly as at step 630 of the third process of FIG. 6.

At step 750, RF transceiver settings algorithm 270 may calculate a privacy level using the generic pose of user 120 associated with received reflected version of the transmitted second probe signal, i.e., the RF reflectance signal, similarly as at step 640 of the second process in FIG. 6. If it is determined that the determined privacy level associated with the received reflected version of the transmitted second probe signal is above or below the threshold, RF transceiver settings algorithm 270 may decide to change settings of external RF source 260. In some embodiments, RF transceiver settings algorithm 270 may determine a current transmission power of external RF 260 source at step 750 as well.

For instance, if the privacy level is above the threshold, RF transceiver settings algorithm 270 may transmit a command to external RF source 260 to indicate that the external RF source should use a lower transmission power higher compared to the current transmission power of external RF source 260. Alternatively, if the privacy level is below the threshold, RF transceiver settings algorithm 270 may transmit a command to external RF source 260 to indicate that external RF 260 source should use a higher transmission power higher compared to the current transmission power of external RF source 260.

Therefore, the RF background profile may be adjusted depending on the privacy level. Upon calculating the privacy level and adjusting settings of external RF source 260 at step 750, the fourth process may loop back to step 710 and the fourth process may be repeated again with the adjusted RF background profile, until a desired privacy level is achieved, i.e., the determined privacy level is equal to the threshold.

Embodiments of the present invention thus provide various advantages. In some embodiments, a non-generic RF reflectance classifier 220 is provided for an RF-based imaging system. Moreover, in some embodiments, settings of RF transceivers, such as RF transceiver 210 and external RF sources 260, may be adjusted to ensure that imaging information related to user 120 cannot be constructed using a universal image reconstruction algorithm or a generic RF reflectance classifier 250. That is to say, uniqueness of the particular imaging system and associated RF background profile can be ensured.

In addition, the privacy level of the system, i.e., the privacy level of a reflected version of a probe signal, may be controlled by other devices than the imaging system itself (i.e., wireless device 110), using RF transceiver settings algorithm 270 such that an unauthorized malicious party would have to control these other devices to be able to set the resolution of the gathered image. Embodiments of the present invention also enable use of an imaging system with different levels of resolution, reduced imaging capabilities or image blocking for different locations with the imaged scene.

Embodiments of the present invention may be exploited in various applications. For instance, in case of health and safety applications, such as monitoring of elderly and/or patients, possible embodiments comprise a secure module comprising an image classifier (i.e., trusted apparatus 130 comprising RF reflectance classifier 220) to be embedded to devices controlled by caretakers or medical persons.

In case of smart home monitoring, such as user interaction with devices, room occupancy detection and user activity detection, possible embodiments comprise having the image classifier (i.e., RF reflectance classifier 220) in trusted apparatus 130, such as a smartphone or a laptop. In case of security and safety, such as monitoring of public spaces, the image classifier (RF reflectance classifier 220) may be stored, e.g., in trusted apparatus 130 in a monitoring or a control room. In case of in-vehicle monitoring, such as driving behaviour monitoring, attention monitoring, passenger monitoring, the image classifier (RF reflectance classifier 220) may be stored in a secure module (trusted apparatus 130) within a vehicle.

Figure 8:
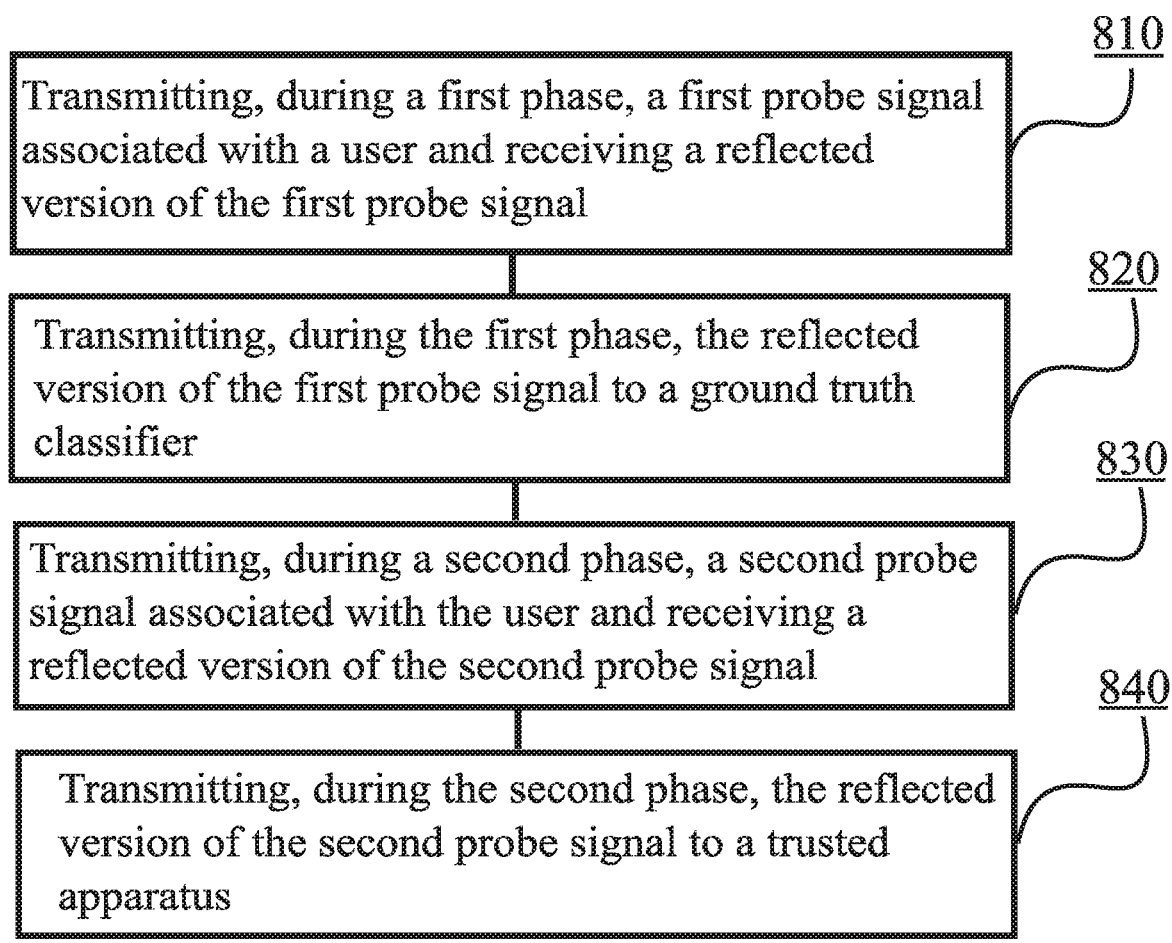
FIG. 8 illustrates a flow graph of a method in accordance with at least some embodiments of the present invention.

FIG. 8 is a flow graph of a first method in accordance with at least some embodiments of the present invention. The phases of the illustrated method may be performed by wireless device 110 or by a control device configured to control the functioning thereof, possibly when installed therein.

The method may comprise, at step 810, transmitting, during a first phase, i.e., a training phase, a first probe signal associated with a user and receiving a reflected version of the first probe signal. In addition, the method may comprise, at step 820, transmitting, during the first phase, the reflected version of the first probe signal to a ground truth classifier. The method may also comprise, at step 830, transmitting, during a second phase, i.e., a usage phase, a second probe signal associated with the user and receiving a reflected version of the second probe signal. Finally, the method may comprise, at step 840, transmitting, during the second phase, the reflected version of the second probe signal to a trusted apparatus, wherein the usage phase is subsequent to the training phase.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an exemplary embodiment, an apparatus, such as, for example, wireless device 110 or trusted apparatus 130, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, wireless device 110 or trusted apparatus 130, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For instance, the second, third and fourth processes of FIGS. 5, 6 and 7, respectively may be combined in any suitable manner In general, a usage phase may comprise at least one of the usage phase for imaging, the usage phase related to transceiver settings and the usage phase related to a RF background profile, wherein the usage phase may be subsequent to the training phase of FIG. 4. Various usage phases may be naturally combined. In general, the training phase may be referred to as a first phase and the usage phase may be referred to as a second phase, wherein the second phase is subsequent to the first phase.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application at least in health and safety applications, smart home monitoring, security and safety and in-vehicle monitoring.

ACRONYMS LIST

ASIC Application-Specific Integrated Circuit
BLE Bluetooth Low Energy
FMCW Frequency Modulated Continuous Wave
FPGA Field-Programmable Gate Array
GSM Global System for Mobile communication
IoT Internet of Things
M2M Machine-to-Machine
MTC Machine-Type Communications
NFC Near-Field Communication
RF Radio Frequency
SIM Subscriber Identity Module
ToF Time-of-Flight
UI User Interface WCDMA Wideband Code Division Multiple Access
WiMAX Worldwide Interoperability for Microwave Access
WLAN Wireless Local Area Network

REFERENCE SIGNS LIST

| | |
|---|---|
| 100 | Wall |
| 110 | Wireless device |
| 120 | User, i.e., an object |
| 130 | Trusted apparatus |
| 210 | RF transceiver |
| 220 | RF reflectance classifier |
| 230 | Ground truth device |
| 240 | Ground truth classifier |
| 250 | Generic RF reflectance classifier |
| 260 | External RF sources |
| 270 | RF transceiver settings algorithm |
| 300-370 | Structure of the apparatus of FIG. 3 |
| 410-450 | Steps of FIG. 4 |
| 510-540 | Steps of FIG. 5 |
| 610-640 | Steps of FIG. 6 |
| 710-750 | Steps of FIG. 7 |
| 810-840 | Phases of the first method of FIG. 8 |

The invention claimed is:

1. An apparatus comprising:
at least one processing core,
and at least one memory including computer program code,
the at least one memory and the computer program code being configured to, with the at least one processing core, cause the apparatus at least to:
transmit by a wireless device, during a training phase, a first probe signal associated with a user and receive a reflected version of the first probe signal;
transmit by the wireless device, during the training phase, the reflected version of the first probe signal to a ground truth classifier;
transmit by the wireless device, during a usage phase which takes place after the training phase, a second probe signal associated with the user and receive a reflected version of the second probe signal; and
transmit by the wireless device, during the usage phase, the reflected version of the second probe signal to a trusted apparatus.

2. The apparatus according to claim 1, wherein the wireless device comprises the trusted apparatus.

3. The apparatus according to claim 1, wherein the apparatus is further caused to:
transmit the reflected version of the second probe signal to the trusted apparatus over a communication link.

4. The apparatus according to claim 1, wherein the apparatus is further caused to:
receive from the ground truth classifier during the training phase, by the trusted apparatus, the reflected version of the first probe signal and initial imaging information of the user associated with the reflected version of the first probe signal;
set, during the training phase, by the trusted apparatus, the initial imaging information of the user as the ground truth;
receive by the trusted apparatus, during the usage phase, the reflected version of the second probe signal; and
determine by the trusted apparatus, during the usage phase, imaging information related to the user based on the received reflected version of the second probe signal and the ground truth.

5. The apparatus according to claim 1, wherein the apparatus is further caused to:
determine a privacy level of the reflected version of the second probe signal; and
adjust at least one setting of at least one Radio Frequency, RF, transceiver based on the determined privacy level.

6. The apparatus according to claim 5, wherein the privacy level of the reflected version of the second probe signal corresponds to likelihood that imaging information related to the user can be determined correctly by an unauthorized malicious party.

7. The apparatus according to claim 5, wherein the wireless device comprises one of the at least one RF transceiver.

8. The apparatus according to claim 7, wherein the apparatus is further caused to:
determine that the privacy level is above a threshold; and
in response to determining that the privacy level is above the threshold, set a transmission power of a third probe signal lower compared to a transmission power of the second probe signal.

9. The apparatus according to claim 7, wherein the apparatus is further caused to:
determine that the privacy level is below a threshold; and
in response to determining that the privacy level is below the threshold, set a transmission power of a third probe signal higher compared to a transmission power of the second probe signal.

10. The apparatus according to claim 5, wherein the at least one RF transceiver comprises an external RF source.

11. The apparatus according to claim 10, wherein the apparatus is further caused to:
determine that the privacy level is above a threshold;
determine a current transmission power of the external RF source; and
in response to determining that the privacy level is above the threshold, set a transmission power of the external RF source lower compared to the current transmission power of the external RF source.

12. The apparatus according to claim 10, wherein the apparatus is further caused to:
determine that the privacy level is below a threshold;
determine a current transmission power of the external RF source; and
in response to determining that the privacy level is below the threshold, transmit a command to the external RF source to use a higher transmission power higher compared to the current transmission power of the external RF source.

13. A method for secure imaging using radio frequency signals, comprising:
transmitting by a wireless device, during a training phase, a first probe signal associated with a user and receiving a reflected version of the first probe signal;
transmitting by the wireless device, during the training phase, the reflected version of the first probe signal to a ground truth classifier;
transmitting by the wireless device, during a usage phase which takes place after the training phase, a second probe signal associated with the user and receiving a reflected version of the second probe signal; and
transmitting by the wireless device, during the usage phase, the reflected version of the second probe signal to a trusted apparatus.

14. The method according to claim 13, wherein the wireless device comprises the trusted apparatus.

15. The method according to claim 13, further comprising:
- transmitting the reflected version of the second probe signal to the trusted apparatus over a communication link.

16. The method according to claim 13, further comprising:
- receiving from the ground truth classifier during the training phase, by the trusted apparatus, the reflected version of the first probe signal and initial imaging information of the user associated with the reflected version of the first probe signal;
- setting, during the training phase, by the trusted apparatus, the initial imaging information of the user as the ground truth;
- receiving by the trusted apparatus, during the usage phase, the reflected version of the second probe signal; and
- determining by the trusted apparatus, during the usage phase, imaging information related to the user based on the received reflected version of the second probe signal and the ground truth.

17. The method according to claim 13, further comprising:
- determining a privacy level of the reflected version of the second probe signal; and
- adjusting at least one setting of at least one Radio Frequency, RF, transceiver based on the determined privacy level.

18. The method according to claim 17, wherein the privacy level of the reflected version of the second probe signal corresponds to likelihood that imaging information related to the user can be determined correctly by an unauthorized malicious party.

19. The method according to claim 17, further comprising:
- determining that the privacy level is above a threshold; and
- in response to determining that the privacy level is above the threshold, setting a transmission power of a third probe signal lower compared to a transmission power of the second probe signal.

20. A non-transitory computer readable medium comprising program instructions for causing an apparatus to perform at least the following:
- transmitting by a wireless device, during a training phase, a first probe signal associated with a user and receiving a reflected version of the first probe signal;
- transmitting by the wireless device, during the training phase, the reflected version of the first probe signal to a ground truth classifier;
- transmitting by the wireless device, during a usage phase which takes place after the training phase, a second probe signal associated with the user and receiving a reflected version of the second probe signal; and
- transmitting by the wireless device, during the usage phase, the reflected version of the second probe signal to a trusted apparatus.

* * * * *